United States Patent [19]

Smith et al.

[11] Patent Number: 5,266,855

[45] Date of Patent: Nov. 30, 1993

[54] ELECTRIC MOTOR FOR CLOTHES WASHING MACHINE DRIVE

[75] Inventors: Dennis E. Smith; John J. A. Williams; Gerald D. Duncan; Graeme D. Thomas; Frank W. Shacklock, all of Auckland, New Zealand

[73] Assignee: Fisher & Paykel, Limited, Auckland, New Zealand

[21] Appl. No.: 566,844

[22] Filed: Aug. 14, 1990

Related U.S. Application Data

[60] Continuation of Ser. No. 361,593, Jun. 2, 1989, abandoned, which is a division of Ser. No. 153,935, Feb. 9, 1988, Pat. No. 4,853,571, which is a division of Ser. No. 22,894, Mar. 6, 1987, abandoned, which is a continuation of Ser. No. 188.629, May 2, 1988, Pat. No. 4,813,243.

[30] Foreign Application Priority Data

| Mar. 6, 1986 | [NZ] | New Zealand | 215389 |
| Sep. 18, 1986 | [NZ] | New Zealand | 217623 |
| Nov. 21, 1986 | [NZ] | New Zealand | 218356 |

[51] Int. Cl.$^5$ ............... H02K 7/08; H02K 21/12; D06F 37/00
[52] U.S. Cl. ..................... 310/90; 310/156; 310/267; 68/3 R
[58] Field of Search ............ 68/12 R, 23, 23.7; 310/42, 43, 89, 153, 156, 214, 215, 261, 90, 267; 318/138; 384/226; 417/423.12, 424.2

[56] References Cited

U.S. PATENT DOCUMENTS

| 686,960 | 11/1901 | Truitt | 192/66 |
| 974,591 | 11/1910 | Patterson | 68/23.5 |
| 1,521,858 | 1/1925 | Bock | 74/573 R |
| 1,757,585 | 5/1930 | Orr | 210/363 |
| 1,760,775 | 5/1930 | Peters | 210/363 |
| 1,772,863 | 8/1930 | Green | 210/367 |
| 1,773,334 | 8/1930 | Altorfer | 68/133 |
| 2,001,965 | 5/1935 | Kirby | 68/23.7 |
| 2,109,620 | 3/1938 | Kirby | 68/23.7 |
| 2,135,084 | 11/1938 | Kirby | 68/26 |
| 2,161,618 | 6/1939 | Dunham | 68/23.3 |
| 2,161,619 | 6/1939 | Dunham | |
| 2,167,086 | 7/1939 | Page | |

(List continued on next page.)

FOREIGN PATENT DOCUMENTS

| 1020189 | 2/1953 | France . |
| 1049418 | 12/1953 | France . |
| 1340648 | 1/1964 | France . |
| 1357373 | 12/1964 | France . |
| 1597379 | 9/1981 | United Kingdom . |
| 2183932 | 6/1987 | United Kingdom . |

*Primary Examiner*—Steven L. Stephan
*Assistant Examiner*—D. R. Haszko
*Attorney, Agent, or Firm*—Trexler, Bushnell, Giangiorgi & Blackstone, Ltd.

[57] ABSTRACT

An electric motor (2) for a clothes washing machine including the motor and a drive, the motor having a stator (25) held outboard of a frame carrying bearings (37, 38) in which a shaft (11) rotates, the shaft carrying the rotor (21) outboard of the stator (25), and permanent magnets (17) on an inner face of the rotor. The stator (25) is formed as an annular helical yoke edgewise wound from a strip of magnetic material and having an inner face and an outer face, the strip having pole pieces (8) formed integrally therewith extending from one edge of the strip and the strip being edgewise wound whereby the pole pieces coincide in stacked groups to form a plurality of poles arranged at equally spaced intervals extending radially outwardly from the outer face of the yoke. Energizable stator windings (26) are wound directly on the poles (8) of the stator and are adapted to be energized through an electronic commutation circuit (65,66) and the rotor (21) is mounted for rotation exteriorly of and relative to the stator, the rotor comprising a backing ring (16) of magnetic material and a series of permanent magnets (17) held at spaced-apart intervals on an inner surface of the backing ring (16) and opposing the poles (8) of the stator (25).

8 Claims, 6 Drawing Sheets

U.S. PATENT DOCUMENTS

| | | |
|---|---|---|
| 2,219,680 | 10/1940 | Caldwell . |
| 2,232,812 | 2/1941 | Studer ................................ 310/215 |
| 2,268,204 | 12/1984 | Dunham . |
| 2,298,095 | 10/1942 | Dunham . |
| 2,298,905 | 10/1942 | Skinner . |
| 2,302,012 | 11/1942 | Dyer . |
| 2,313,644 | 3/1943 | Hvid . |
| 2,361,767 | 10/1944 | Hays, Jr. . |
| 2,366,236 | 1/1945 | Clark . |
| 2,375,635 | 5/1945 | Dyer . |
| 2,471,217 | 5/1949 | Johnson . |
| 2,513,844 | 7/1950 | Castner et al. . |
| 2,561,257 | 7/1951 | Woodson . |
| 2,579,598 | 12/1951 | Morrison . |
| 2,610,498 | 9/1952 | Geldhof et al. . |
| 2,656,699 | 10/1953 | Chapin . |
| 2,656,702 | 10/1953 | Chapin ................................ 68/154 |
| 2,660,044 | 11/1953 | Williams ............................... 68/23 |
| 2,665,576 | 1/1954 | Thiele . |
| 2,702,093 | 2/1955 | Sherrill ............................ 417/423.13 |
| 2,709,956 | 6/1955 | Litzenberg ...................... 417/423.12 |
| 2,709,965 | 6/1955 | Litzenberg . |
| 2,730,886 | 1/1956 | Castner . |
| 2,845,156 | 7/1958 | Dayton . |
| 2,872,801 | 2/1959 | Smith . |
| 3,106,081 | 10/1963 | Mitchell . |
| 3,152,463 | 10/1964 | Sones et al. . |
| 3,216,226 | 11/1965 | Alger et al. .............................. 68/23 |
| 3,279,223 | 10/1966 | Severance et al. . |
| 3,324,690 | 6/1967 | Button . |
| 3,339,097 | 8/1967 | Dunn .................................... 310/194 |
| 3,356,920 | 12/1967 | Button . |
| 3,503,086 | 3/1970 | Mason et al. . |
| 3,511,067 | 5/1970 | Matzen . |
| 3,604,222 | 9/1971 | Wutherich et al. ...................... 68/24 |
| 3,783,359 | 1/1974 | Malkiel . |
| 3,882,336 | 5/1975 | Boyd et al. ........................... 310/216 |
| 3,914,963 | 10/1975 | Brimer . |
| 4,027,215 | 5/1977 | Knight et al. . |
| 4,232,536 | 11/1980 | Koseki et al. ....................... 68/12 R |
| 4,245,488 | 1/1981 | Alley . |
| 4,250,435 | 2/1981 | Alley et al. . |
| 4,250,544 | 2/1981 | Alley . |
| 4,254,641 | 3/1981 | Gauer et al. . |
| 4,327,302 | 4/1982 | Hershberger . |
| 4,392,073 | 7/1983 | Rosenberry, Jr. ................... 310/216 |
| 4,395,815 | 8/1983 | Stanley et al. ...................... 310/216 |
| 4,468,938 | 9/1984 | McMillan . |
| 4,528,495 | 7/1985 | Boyd, Jr. ............................. 318/138 |
| 4,540,921 | 9/1985 | Boyd . |
| 4,563,786 | 1/1986 | Brunswick . |
| 4,626,178 | 12/1986 | Terumoto ........................... 417/366 |
| 4,672,250 | 6/1987 | Seitz . |
| 4,698,542 | 10/1987 | Muller ............................... 310/67 R |
| 4,712,035 | 12/1987 | Forbes et al. ....................... 310/269 |
| 4,712,055 | 12/1987 | Houser . |
| 4,813,248 | 3/1989 | Smith . |
| 4,835,839 | 6/1989 | Forbes . |
| 4,853,571 | 8/1989 | Smith et al. ........................... 310/90 |
| 4,998,052 | 3/1991 | Erdman et al. ..................... 318/701 |
| 5,040,285 | 8/1991 | Williams et al. ...................... 29/596 |

ELECTRIC MOTOR FOR CLOTHES WASHING MACHINE DRIVE

This is a continuation of copending application Ser. No. 07/361,593 filed on Jun. 2, 1989, now abandoned; which is a divisional of prior application Ser. No. 153,935, filed Feb. 9, 1988 now U.S. Pat. No. 4,853,571; which was a divisional of prior application Ser. No. 022,894, filed Mar. 6, 1987 now abandoned, which was continued as application Ser. No. 07/188,629 filed May 2, 1988, now U.S. Pat. No. 4,813,243.

BACKGROUND AND SUMMARY OF THE INVENTION

This invention relates to drives for clothes washing machines of the type having a cabinet in which an agitator is mounted on a vertical axis and is oscillated back and forth with a perforated spin tub which in turn is mounted within a water tight container, the spin tub and the agitator rotating continuously in one direction to give a spin action, said cabinet containing an electric motor and driving means for the agitator and spin tub and/or clothes washing machines incorporating such drives.

It is an object of the present invention to provide a drive for a clothes washing machine of the type described and/or a clothes washing machine incorporating such a drive which will at least provide the public with a useful choice.

Accordingly, in one aspect the invention consists in a drive for a clothes washing machine of the type having a cabinet in which an agitator is mounted on a vertical shaft so as to rotate therewith and is oscillated back and forth within a coaxially mounted perforated spin tub, the spin tub and the agitator rotating continuously in one direct to give a spin action, and the perforated spin tub and agitator in turn being mounted within a water tight container, said cabinet containing an electric motor and driving means to oscillate said agitator back and forth or rotate said spin tub continuously in one direction, and is characterized in that at least one part of said spin tub one part rotatable with said agitator are axially movable relative to each other; in that each said one part has a part of an interconnecting means associated therewith; and in that interconnection actuating means are provided operable in a washing sequence to actuate said parts of said interconnecting means by relative axial movement of said at least one part rotatable with said agitator and said at least one part of said spin tub to connect said agitator to said spin tub when spin action is required and to actuate said parts of said interconnecting means to separate by opposite relative axial movement to permit said agitation of said agitator without material relative movement of said spin tub during a washing phase in said sequence.

In a further aspect the invention consists in a drive system comprising an electric motor having a stator carrying energizable windings on poles thereof, a shaft carrying said rotor and being rotatable in frames forming part of said electric motor, said frames also mounting said stator of said motor, a clothes washing agitator, a perforated spin tub in a washing container in turn mounted in a cabinet, with said motor, said clothes washing agitator and said spin tub being mounted coaxially on said shaft and rotatable thereon in a mode selected from an agitating mode in which said rotor, said shaft and agitator are oscillated backwards and forwards over an arc of movement and said spinning tub remains substantially stationary and a spinning mode in which said rotor, said spin tub and said agitator are rotated continuously in one direction. At least one part of said spin tub and one part rotatable with the agitator are axially movable relative to each other, each said one part having a part of an interconnecting means associated therewith, and interconnecting actuating means are provided operable in a washing sequence to actuate said parts of said interconnecting means by relative axial movement of said at least one part of said agitator and said at least one part of said spin tub to connect said agitator to said parts of said interconnecting means to separate by opposite relative axial movement to permit said agitation of said agitator without material relative movement of said spin tub during a washing phase in said sequence.

In a still further aspect the invention consists in a drive for a clothes washing machine of the type having a cabinet in which an agitator is mounted on a vertical shaft so as to rotate therewith and is oscillated back and forth within a perforated spin tub, the spin tub and the agitator rotating continuously in one direction to give a spin action and the perforated spin tub and agitator in turn being mounted within a water tight container, said cabinet containing an electric motor and driving means to oscillate said agitator back and forth or rotate said spin tub continuously in one direction, characterized in that said drive includes interconnecting means provided between said driving means and said spin tub, said interconnecting means including actuating means actuable by the presence or absence of a substantially predetermined quantity of water in said container so that when at least said predetermined amount of water is present in said container said interconnecting means are disconnected between said driving means and said perforated spin tub and when water is substantially absent from said container said interconnecting means connect said driving means to said perforated spin tub so that said perforated tub will rotate with said driving means.

In a still further aspect the invention consists in a drive system for a clothes washing machine of the type having a cabinet in which an agitator is mounted on a vertical shaft so as to rotate therewith and is oscillated back and forth by an electric motor within a coaxially mounted perforated spin tub, the spin tub and the agitator being rotated continuously in one direction by said electric motor to give a spin action, and the perforated spin tub and agitator in turn being mounted within a water tight container, said cabinet containing an electric motor, said drive selectively oscillating said agitator back and forth and rotating said spin tub and agitator continuously in one direction, said drive including at least one part of said spin tub and one part rotatable with said agitator which are axially movable relative to each other, each said one part having a part of an interconnecting means associated therewith; and interconnection actuating means are provided operable in a washing sequence to actuate said parts of said interconnecting means by relative axial movement of said at least one part rotatable with said agitator and said at least one part of said spin tub to connect said agitator to said spin tub when spin action is required and to actuate said parts of said interconnecting means to separate by opposite relative axial movement to permit said agitation of said agitator without material relative movement of said spin tub during a washing phase in said sequence.

In a still further aspect the invention consists in an electric motor comprising a stator carrying energizable windings on poles thereof, a rotor, a motor frame, said frame having bearing mountings in a central disposition and having coacting locating means near outer edges thereof arranged to hold said frame with said bearing mountings separated and axially aligned, said frame having stator locating means arranged to hold the outer cylindrical surface of a stator concentric with said bearing mounting of said frame, a pair of bearings mounted in said bearing mountings, a shaft rotatably mounted in said bearings and carrying said rotor, said rotor comprising a backing ring of a magnetic material, a series of permanent magnets spaced apart on an inner surface of said backing ring and rotatable exteriorly of said stator windings, a hub mounted on said shaft, and a backing ring support holding inner faces of said permanent magnets concentric with said shaft.

In a still further aspect the invention consists in a clothes washing machine comprising a cabinet, a container for wash water suspended in said cabinet, an electric motor mounted below said container, an agitator within said container, a drive shaft between said electric motor and said agitator so that said electric motor directly drives said agitator, a spin tub within said container and within which said agitator is mounted, said spin tub being rotatably mounted on said drive shaft, sealing means between said drive shaft and said container and interconnecting means having two positions in one of which positions said interconnecting means connects said spin tub to said agitator so as to rotate therewith and in which other position said spin tub is disconnected from said agitator, an electric supply means arranged to drive said agitator in a forward and reverse motion to give agitation to clothes placed within said spin tub in one mode of operation when said spin tub is disconnected from said agitator, and arranged to rotate said spin tub and said agitator continuously in one direction when the spin tub and the agitator are interconnected by said interconnecting means.

In a still further aspect the invention consists in a clothes washing machine comprising a cabinet, a container for water suspended in said cabinet, an electric motor mounted below said container, an agitator within said container, a drive shaft between said electric motor and said agitator so that said electric motor directly drives said agitator, a spin tub within said container and within which said agitator is mounted, said spin tub being rotatably mounted on said drive shaft, sealing means between said drive shaft and said container, and interconnecting means having two positions, in one of which positions said connecting means connects said spin tub to said agitator so as to rotate therewith and in which other position said spin tub is disconnected from said agitator, said electric motor being arranged to drive said agitator in a forward and reverse motion to give agitation to clothes placed within said spin tub in one mode of operation when said spin tub is disconnected from said agitator, and arranged to rotate said spin tub and said agitator continuously in one direction when the spin tub and the agitator are interconnected by said interconnecting means, at least one part of said spin tub and one part rotatable with said agitator being axially moveable relative to each other, each said one part having a part of said interconnecting means associated therewith, and interconnection actuating means are provided operable in a washing sequence to actuate said parts of said interconnecting means by relative axial movement of said at least one part rotatable with said agitator and said at least one part of said spin tub to connect said agitator to said spin tub when spin action is required and to actuate said parts of said interconnecting means to separate by opposite relative axial movement to permit said agitation of said agitator without material relative movement of said spin tub during a washing phase in said sequence.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples.

BRIEF DESCRIPTION OF THE DRAWINGS

One preferred form of the invention will now be described with reference to the accompanying drawings, in which.

DETAILED DESCRIPTION OF THE INVENTION

Figure 8:
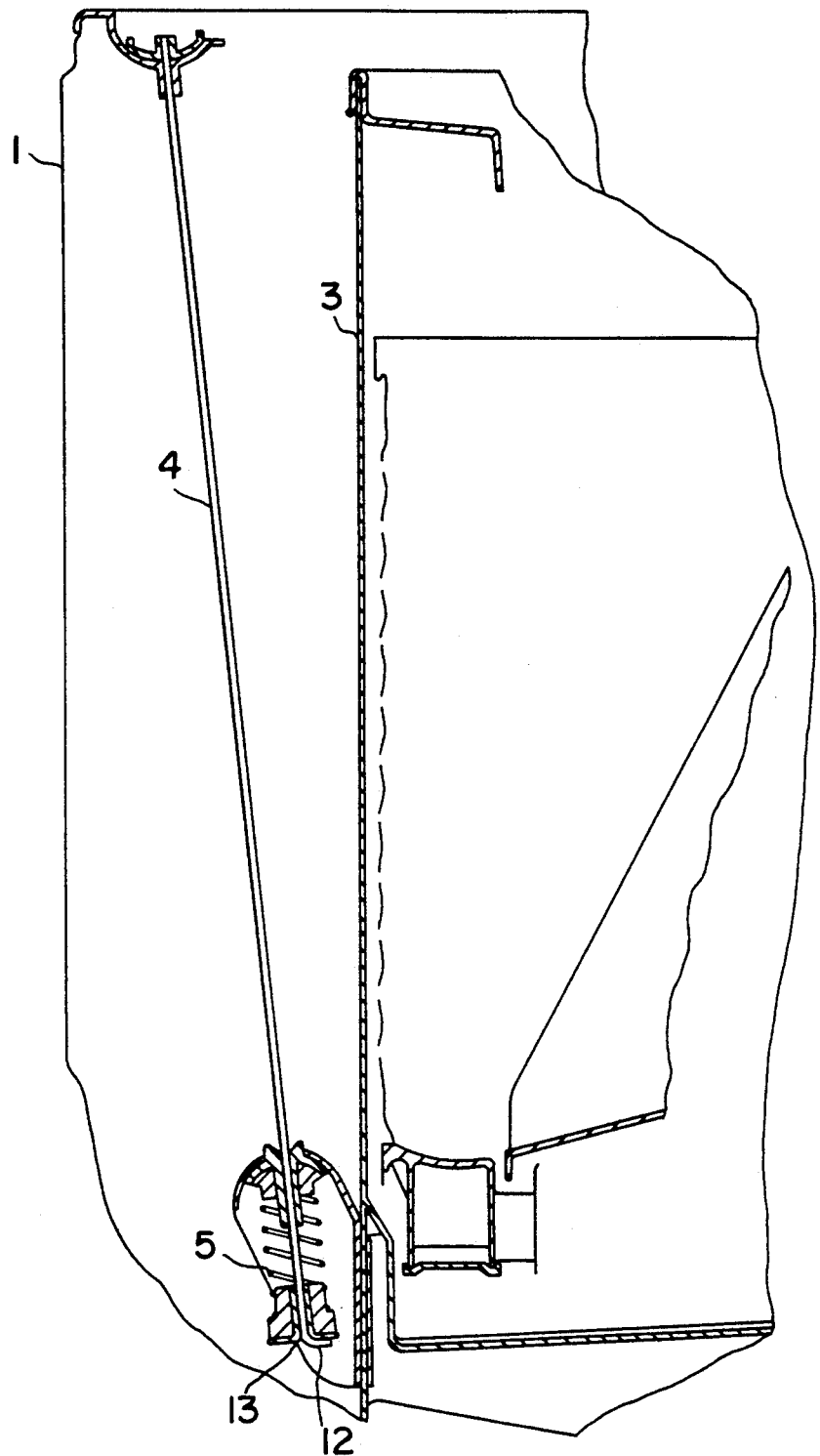
FIG. 8 is a partial elevation at 45° to the view of FIG. 1.

Referring to the drawings, a clothes washing machine comprises a cabinet 1 of square cross section which has mounted in it an electric motor 2 constructed according to the present invention as will be described further later. A water container 3 is suspended within the cabinet 1 by suspension rods 4 and springs 5, and, for example, four springs and rods are provided, and the motor and other mechanisms are attached to the container 3. The springs are provided in the corners of the square cross section cabinet 1; accordingly, parts of the rod are shown in sectional view in FIG. 8 which is at 45° to the other sectional view of FIG. 1. By "water" is meant washing liquid, e.g. water and detergent. Contained within the water container 3 there is a perforated spin tub 6 and within the spin tub is an agitator 7. An opening lid 9, shown only partially, is provided through which clothes may be inserted into the container and within the spin tub 6, and the spin tub is partly balanced by upper balancing ring 10 shown only in the rear at one side in FIG. 1. The springs terminate in hooks 12 which engage in apertures 13 in the container base molding 29. The agitator 7 is mounted on a hollow drive shaft 11 so as to rotate therewith but is slidable axially thereon. The spin tub 6 is coaxially mounted on the shaft 11 so as to be rotatable and also slidable axially thereon.

The motor 2 is constructed as follows. A rotor 15 has a backing ring 16 (FIG. 2) and the backing ring is formed from a strip of magnetic material, for example a silicon steel alloy, and the strip of steel is coiled on edge with adjacent surfaces lightly insulated and touching each other to provide a short hollow cylinder or annular helix. Inside the helix there is provided a series of magnets 17, the backing ring 16 being expanded slightly before being placed over the magnets placed in a mold. The magnets are permanent magnets of a material capable of being magnetized to a high flux value, e.g. "neodymium" iron made by Magnaquench Inc., and the annulus and the magnets are held in place by a plastic member 18 which has a hub 19, a disc or spoked connector portion 20, and a substantially cylindrical element 21, the member 18 being molded over the backing ring and magnets so as to maintain the inner faces of the magnets 17 concentric with the axis of the hub 19.

Figure 9:
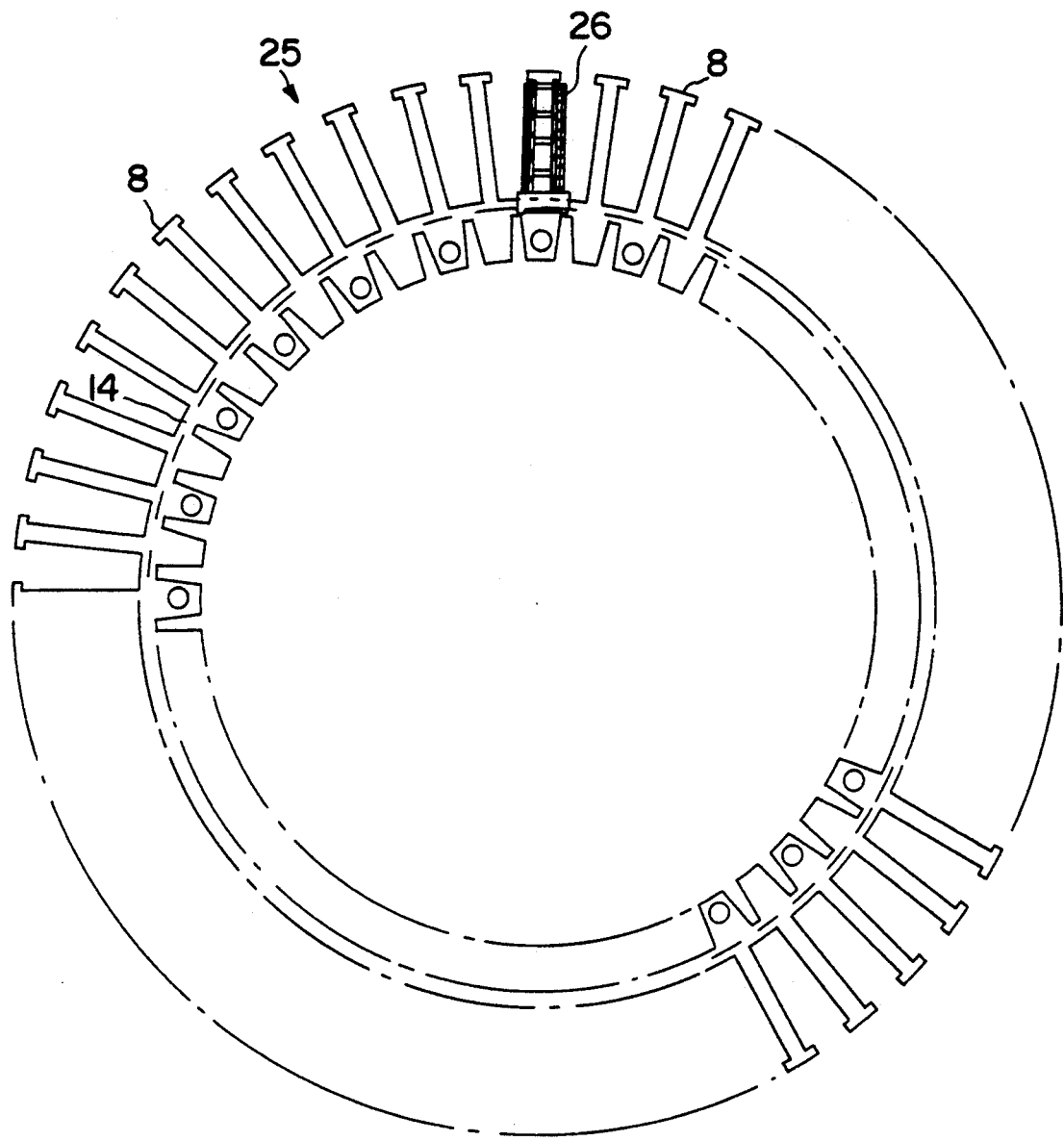
FIG. 9 is a rear view of an agitator motor forming part of the invention.

The stator 25 of the motor has a magnetic core which comprises a strip of magnetic material, again preferably a silicon steel alloy or other low hysteresis steel, which is preformed to provide spaced apart pole pieces, and again this strip is formed by bending on edge to form an annular helix in the form of a hollow cylinder with the poles 8 formed by the stacked pole pieces pointing outwardly. As may be seen in FIG. 9, the poles S are connected together by a narrow band 14 so that bending on edge is relatively easily effected. To provide insulation for windings on the poles of the core, a top insulating molding 22 is placed on one side of the poles and a bottom insulating molding 23 placed on the opposite side, meeting at a joint line 24. Windings are placed on the moldings wound around each pole and such windings 26 are effected on the poles directly.

It is preferable that the stator be wound in a three phase star connected mode and the windings are made and connected using known techniques.

The stator 25 and the rotor 15 are mounted as will shortly be described.

The water container 3 is preferably an injection molding, and the base 29 has motor support columns 30 preferably braced with stiffening webs 31. These webs extend to the outer perimeter of the container 3 and are molded integrally with the container.

The motor 2 includes two bearing frames 32 and 33 which comprise injection moldings of a die cast metal or plastic material or preferably steel pressings or plastic material. Preferably the frames 32 and 33 are produced from the same mold or set of dies, thus ensuring equality of dimensions between the two frames. The frames are carefully designed and made so that the bearing moldings 27 and 28 are concentric with locating pins or dimples S4 and corresponding holes 35 at the periphery of the frames and with the external angle 36 in which the inner corner 37 of the stator 25 fits with an interference fit.

Stiffening depressions 49 are provided to stiffen the frames, and on assembly one frame is assembled rotated 45° relative to the other frame to provide correct matching of holes and dimples.

Bearings 38 and 39 fit in the bearing mountings 27 and 28 and the bearings are spaced apart by a spacing tube 40 which encircles the drive shaft 11. The hub 19 is fixed to the shaft 11 by a bolt 41 engaging a nut 42 held in the hollow of the shaft 11 by the shaft 11 being swaged down to provide splines which engage corresponding spline spaces 42 in the hub 11. For transport purposes a further nut 43 holds the assembly supported by suspension rods and fixed to a cabinet member 44.

The spin tub 6 comprises a stainless steel perforated hollow cylinder 45 fixed to a plastic extruded base 46, e.g., by spinning the lower edge of the cylinder 45 on to the periphery of the plastic base 46. If desired, a lower balancing ring 47 is provided and the balancing rings are each comprised as a hollow ring with baffles and liquid container therein and the rings are each closed by an annular disc 48. One balancing ring, preferably the ring 10, was found to give reasonable balance while spinning.

A plurality of bridges 50 are provided at spaced intervals with gaps between them, and the bridges connect the balancing ring 47 (if fitted) to an air chamber in the form of a bell 51 having an open mouth directed downwardly and a tube 52 integral therewith which surrounds the shaft 11. A low friction plastic bearing 53 enables the plastic base 29 and consequently the spin tub 6 to rotate and slide axially on the drive shaft 11.

A series of downwardly directed dog clutch teeth 55 (FIG. 2) of a high impact duty material, e.g. a high impact duty plastic material, are carried by a carrier 56 riveted, screwed or otherwise fixed to the air chamber 51, e.g. by screws 57. A ring 60 carries coacting dog clutch teeth 61 also of a high impact duty material, and the ring 60 is rotatable by and axially slidable on the drive shaft 11, e.g. by engagement of splines on the ring 60 with splines on the drive shaft 11. The agitator 7 has a boss 62 with inner splines 63 engaging outer splines 64 on the ring 60 so that rotation of shaft 11 results in rotation of the teeth 61 and the agitator 7, and the boss 62 slides axially on the drive shaft 11 as may be seen by comparing the "up" position of elements on the left hand side of FIGS. 1 and 2 with the "down" position on the right hand side.

The air chamber 51 is designed to provide a flotation or buoyancy force resulting from the entrapment of air in the air tight chamber 51 when water closes the perimeter of the lower edge of the air chamber 51. In the event that water enters the air chamber 51, e.g. because of turbulence during agitation, the lower face could be closed off with the disc 54.

Figure 1:
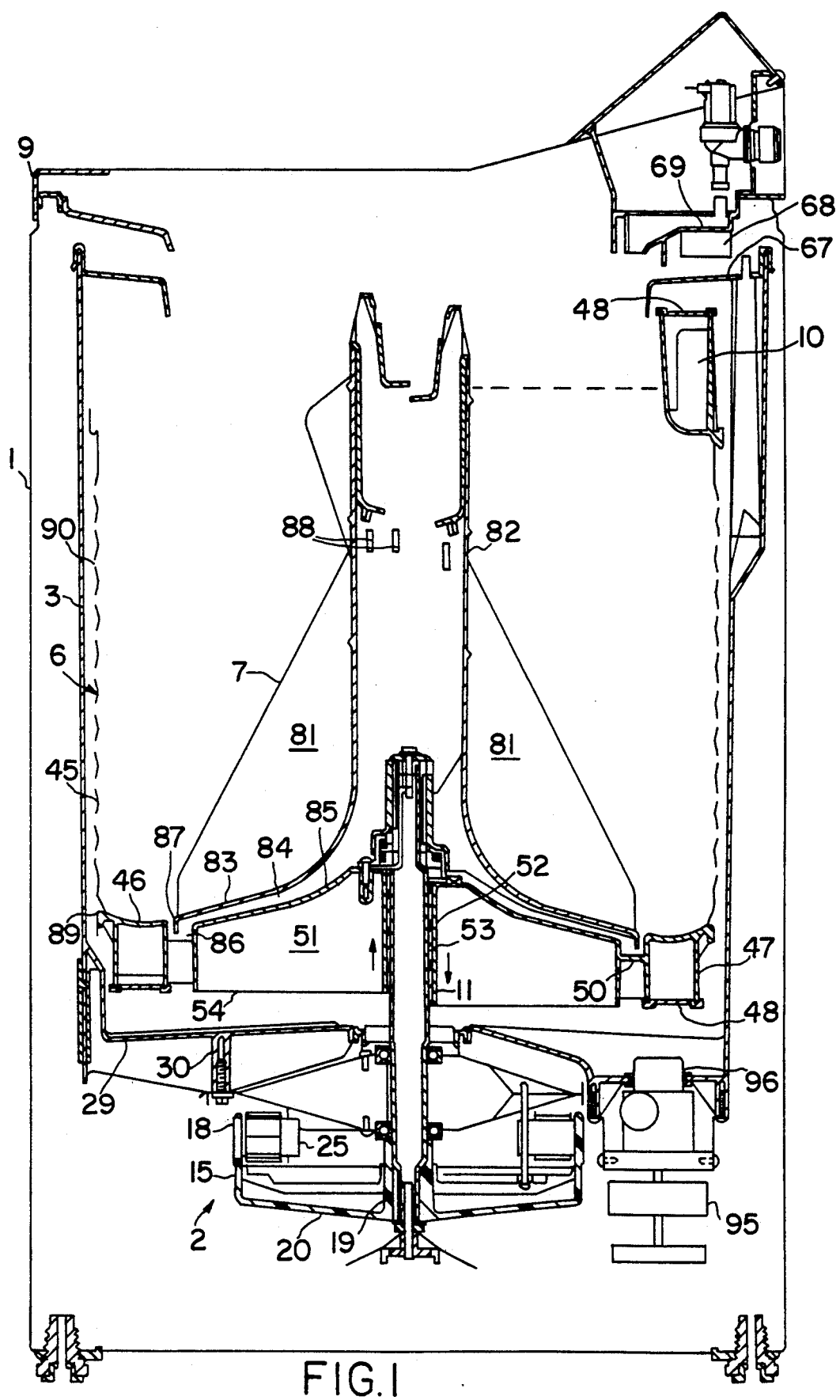
FIG. 1 is a cross-sectional elevation of a clothes washing machine constructed according to the invention, with some parts shown at 45° plan to other parts.
Figure 2:
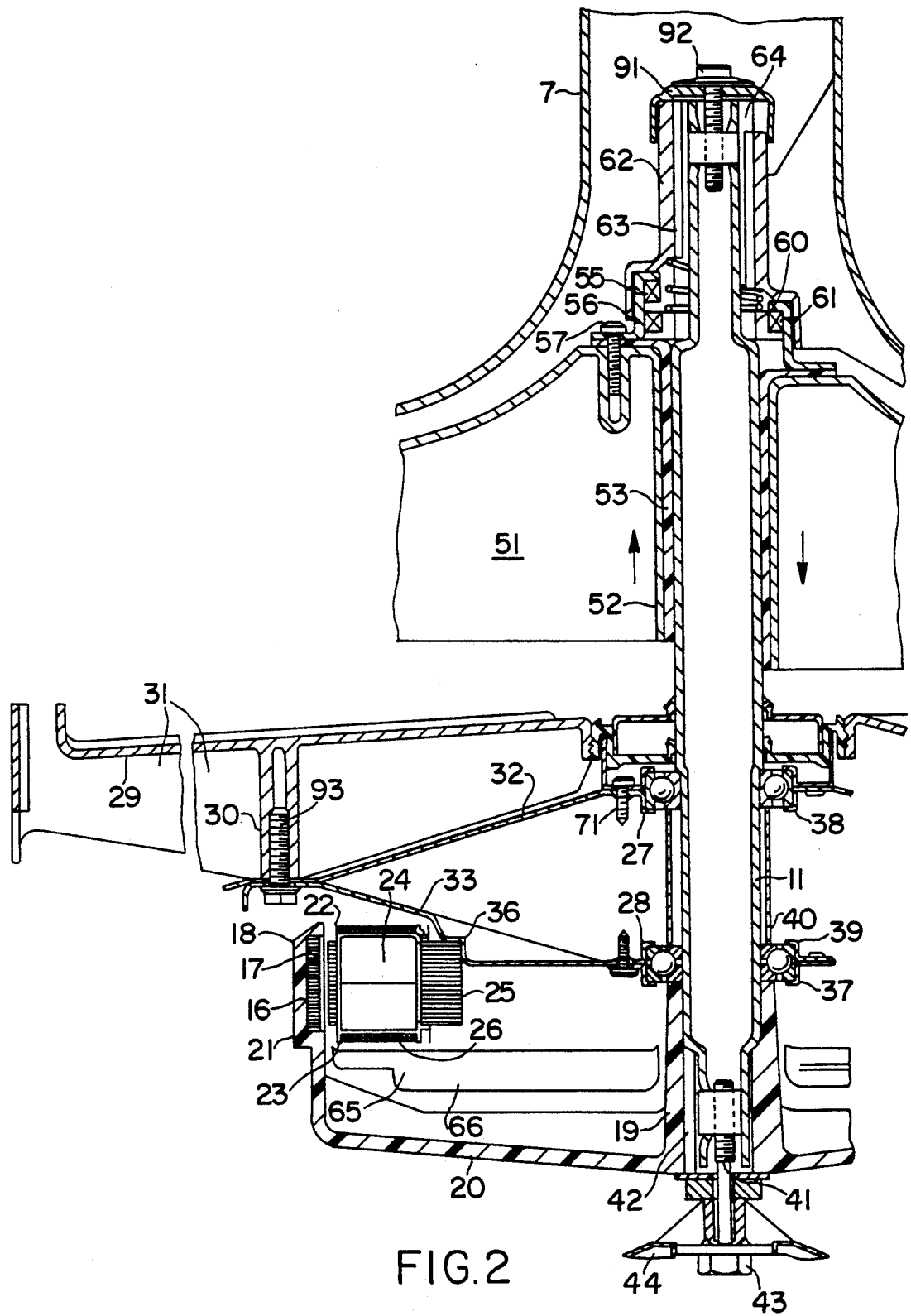
FIG. 2 is an enlarged view partly in cross section of a water container, spin tub, agitator, drive and electric motor.
Figure 3:
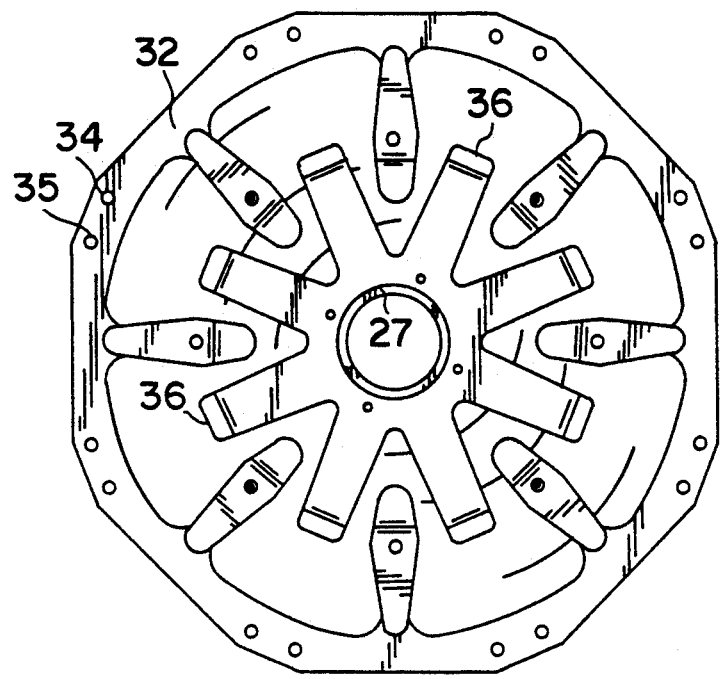
FIGS. 3 and 4 are respectively a plan view cross section of preferred motor frames incorporated in the invention in the preferred form.
Figure 4:
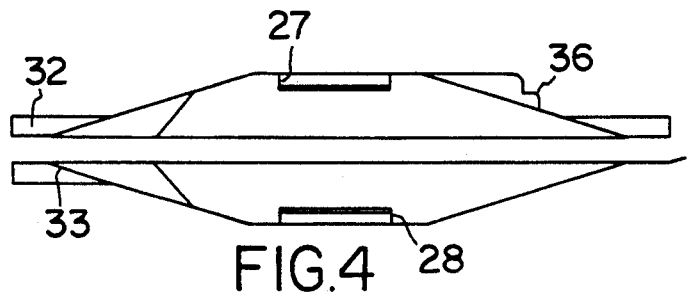

The buoyancy force is at least sufficient to lift the spin tub 6 and the agitator 7 when a substantially predetermined volume of water is provided in the container 3, and the spin tub and agitator 7 are shown in the "up" position on the left hand side of FIGS. 1 and 2 and in the "down" position on the right hand side. When the spin tub 6 is in the up position, i.e. supported by flotation of the air chamber 51, the teeth 55 and the teeth 61 are disengaged from each other and the agitator may be rotated freely over any desired rotational movement independent of the spin tub 6. When water is absent or substantially absent from the container 3, the spin tub 6 sinks until the teeth 55 and 61 are engaged. The spin tub 6 and agitator will then be rotated as one unit and this rotation will be effected continuously in one direction to spin clothes in the spin tub to a drier condition in the known way. To assist in freeing frictional contact between the axially sliding parts during up and down movement of the spin tub during filling with, and emptying of water, control means are provided for controlling motor 2 to give a slow agitating action, i.e. forward and reverse rotation over a small arc of movement. At each reversal the dogs will reverse contact and be free of each other for a short time due to clearances as between the dogs and spaces between the dogs.

To assist in fixing the spin tub against rotation during agitation, i.e. when the agitator is in the up position, the upper edge 67 of the spin tub may contact a frictional surface 68 on the underside of a top member 69 of the container 3.

The agitator 7 has external blades 81 thereon which extend from the surface of both column 82 and the upper surface of an upper coned disc 83. There is a space 84 between the disc 83 and the upper surface 85 of the air chamber 51; this space may be divided with radial vanes (not shown), since the purpose of the space arrangement is to provide a centrifugal impeller. Such an impeller may be otherwise provided, e.g. an independent centrifugal pump could be provided.

Outlet openings 86 are provided from the space 84 at or near the outer edge of the disc 83, the outer edge 87 of which is turned downwardly and operates in close proximity to the inner edge of the balance ring 46. As a result of this construction a pumping action is given, pumping water from the center of column 82 from apertures 88 through space 84 below balance ring 46 to space 86 between the spin tub 6 and the container 3, and lint is restrained in this space before the water re-enters the spin tub through the holes 90. If desired, a container may be mounted on the column 82, such container holding a clothes conditioner in the known way.

electronic commutation equipment 65 is provided on an annular printed circuit board in an annular container 66 mounted below the stator 25, and the electronic commutation equipment is preferably enclosed in a compound for protection and heat sinking, and is such as to enable the electric motor 2 to move in a backward and forward motion thus causing the shaft 11 to be oscillated backward and forth resulting in the agitator 7 being also rotated in a back and forth motion to give the well known washing motion. Such electronic commutation equipment is described in copending New Zealand Application No. 213489/213490 and corresponding UK Patent Application 8622289 and U.S. patent application 06/908,176 which are incorporated herein by reference. The electronic commutation equipment 65 is also arranged to drive the motor continuously to give a spin action, and to drive the spin tub with the agitation when the absence of water from the container 3 results in engagement of teeth 55 and 61 as above described.

However, when the agitator is preferably given a slow agitation motion and the container 3 has water in it, at least to a predetermined level, the flotation force of air in air chamber 51 causes the air chamber, spin tub agitator to rise. The teeth 61 and the agitator may now move independently of the spin tub and thus may be oscillated back and forth at a desired rate and over any desired angle of rotation to give a washing action without material movement of the spin tub.

Figure 5:
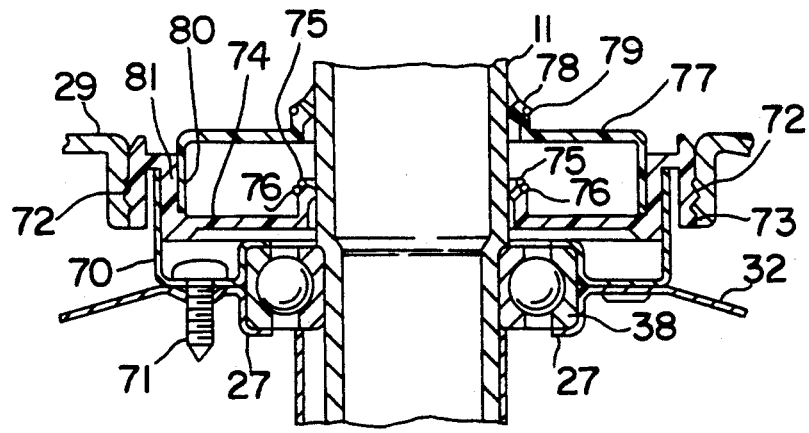
FIG. 5 is a further enlarged view of a seal shaft and bearings being part of FIG. 2.
Figure 6:
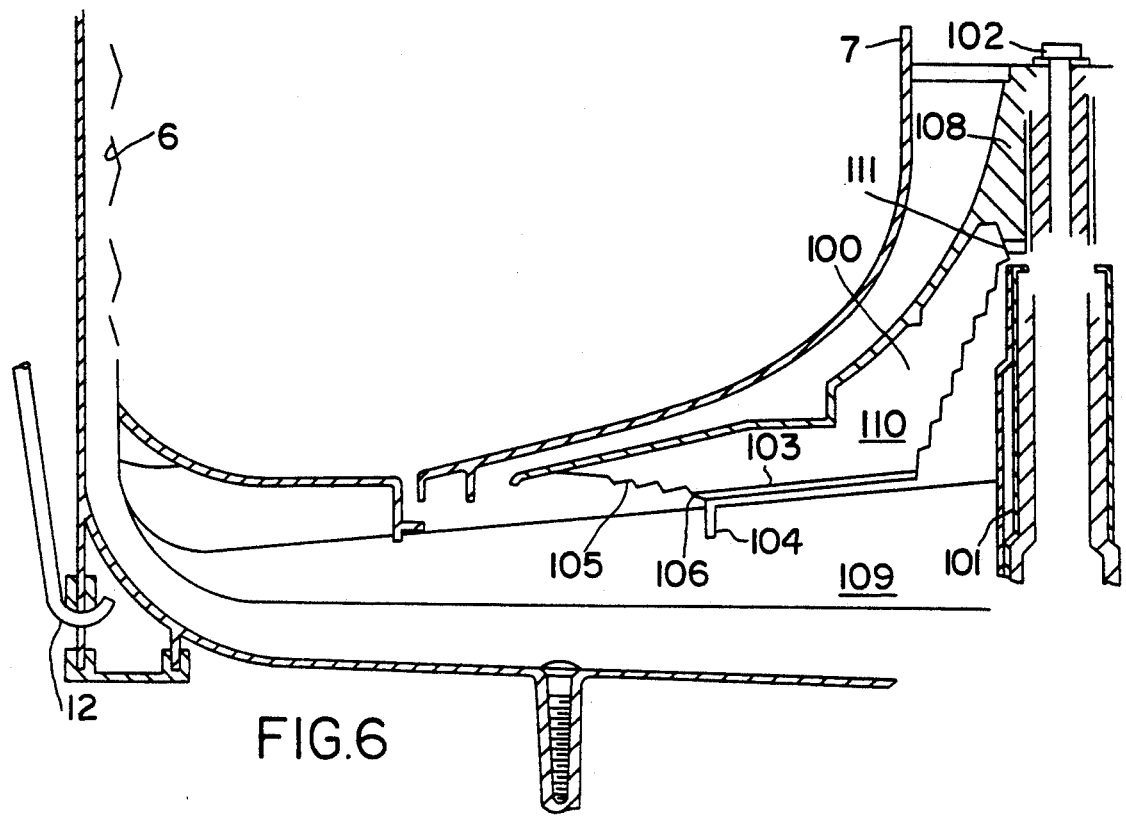
FIG. 6 is a partial cross section of an alternative embodiment of the invention.

To provide seals between the drive shaft 11 and the base 29 of the water container, a short cylinder of, e.g., steel, 70 (FIG. 5) is fixed to the upper frame 32 by a screw 71, and a flange 27 holds the bearing 38 in place. The short cylinder 70 supports a seal 72 against the wall 73 of an aperture in the water container base 29, and a disc 74 holds a further seal 75 against the shaft 11, being reinforced by a backing ring 76. A played disc 77 holds a further seal 78 against the shaft 11 reinforced also by a spring 79, the flange 80 sitting within a short cylinder 81 integral with disc 74.

The seal 72, short cylinder 81, disc 74 and seal 75 are integral with each other, and the played disc 77, seal 78 and flange 80 are integral with each other. Both units are made of "Neoprene" or other known flexible seal material.

A pump 95 is provided for the purpose of draining the container 3, and the pump 95 is mounted directly about an opening 96 in a lower part of the container 3 and thus a single flexible tube can run from the pump outlet through the back of the cabinet to the user drain connection point.

It is to be noted that the bearings 37 and 38 are a slip fit on the drive tube 11, and tightening of the bolt 41 and a cap 91 by a screw 92 clamps both bearings into position. Removal of the rotor securement screw 92 and the bolt 41 can result in the drive tube 11 being removed from above and the motor rotor 15 being removed from below. The motor 2 is removable as a unit after removing also the screws 93 holding the frames 32 and 33 in position. Thus, for maintenance this removal can be readily effected. Furthermore, following removal of the securement screw 92, the agitator and agitator hub can be removed and the spin tub assembly then lifted off from above. Thus, maintenance is very simple.

It is also to be noted that because the spin tub and its contents float during the agitation phase, no thrust bearing is required. Also, the bearing 53 operates under water and only under low speed conditions, i.e. the agitator speed relative to the substantially stationary spin tub, and therefore the bearing need only be a light duty bearing.

An alternative form of interconnection means is provided as follows:

The agitator 7 has associated with it a bell 100, both being fixed to the shaft 101 by a bolt 102. The shaft 101 corresponds to the shaft 11 and is driven by an electric motor as above described.

Within the bell 100 is a rise and fall member 103 which is a plastic molding sealably attached by flexible bellows 105, e.g. of "Neoprene", to the outer edge 106 of the plastic member 103 and to the edge of the bell 100. A further flexible bellows is sealably attached to the member 103 and to the hub of the bell 100. The member 103 has prongs or dogs spaced at intervals thereon, and such prongs or dogs engage in the spaces between castellations 109 in the bottom of the spin tub 6. A spring (not shown) is provided which exerts a downward force from the hub 108 on the member 103, and the cavity 110 is open to the atmosphere through a cross hole or notch 111 in the hub and a series of holes in the shaft or drive tube 101. This arrangement is such that when the container 3 is emptying, the spring moves the member 103 downwardly so that the prongs or dogs 104 engage in the spaces between the castellations 109 and thus the spin tub will move with the agitator and be rotated with that agitator continuously for the purpose of spinning. However, when the container 3 has water in it to a predetermined level, the hydrostatic water pressure on the undersurface of the member 103 causes that member to rise against the pressure of the spring, air venting through the air holes above-mentioned, and the prongs or dogs are then raised out of contact with the spin tub and the agitator may now move independently of the spin tub and thus may be oscillated back and forth to give washing action.

Figure 7:
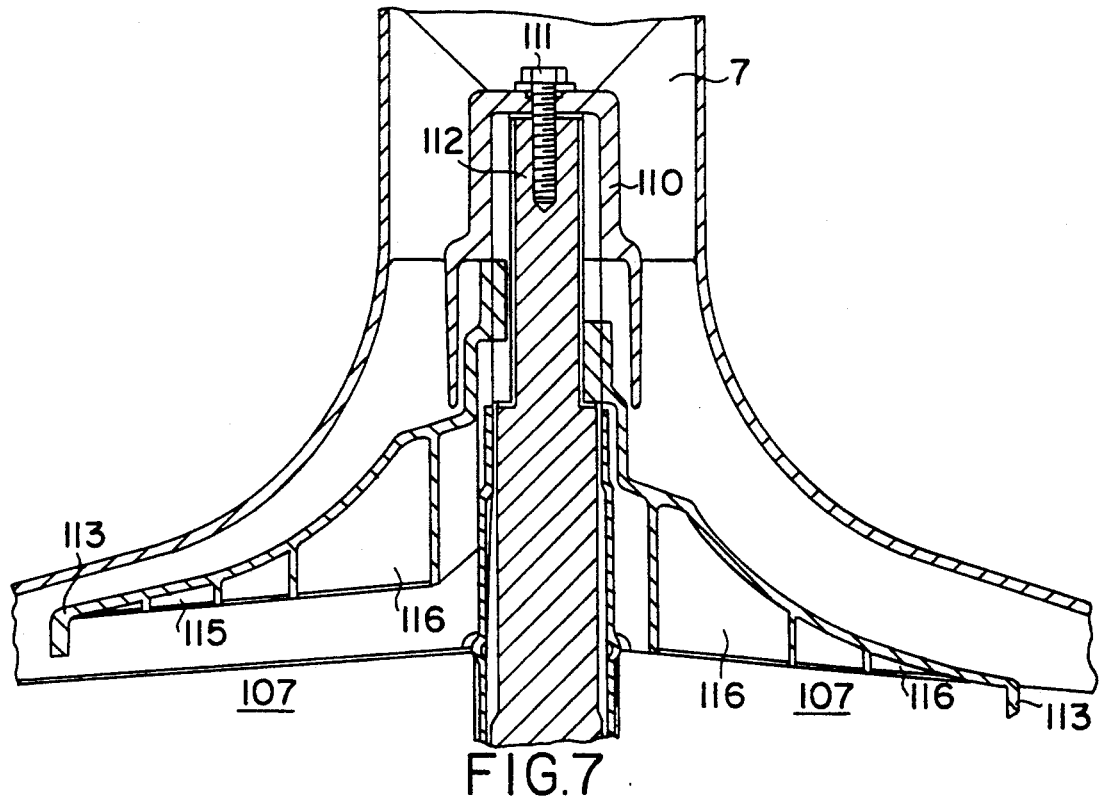
FIG. 7 is a partial cross section of a further alternative embodiment of the invention.

In a further alternative arrangement of the spin tub to agitator interconnecting means shown in FIG. 7, the agitator 7 is combined with a hub 110 fixed by a bolt 111 to a solid splined shaft 112. An air chamber in the form of a bell member 115 is a slidable fit on the shaft 112 and has air entrapment spaces 116 in which air is trapped by rising water in the container 3 when the latter is being filler preparatory to agitation occurring. The bell 115 then acts as a float, raising detents or dogs 113 from engagement with castellations 107, as shown on the right hand side of FIG. 7, to a disengaged position as shown on the left hand side of FIG. 7.

A least in the preferred forms, the invention provides the following advantages:

1. The electric motor assembly and construction is integrated with the drive system in a manner such that a simple shaft and pair of bearing support the rotor at one end of the agitator and spin tub at the other end, avoiding the need for separate shafts and bearings for the motor and for the agitator and spin tub drive.
2. The mounting of the stator and the rotor outboard of the lower motor frame enable ready replacement of the stator and/or rotor.
3. The mounting of the electronics in an annular disk associated with the stator of the motor reduces the length of interconnecting wiring and enables a compact factory wired unit to be provided.

We claim:

1. An electric motor for a clothes washing machine comprising: a stator carrying energizable windings on poles thereof; a rotor; a motor frame having a single pair of spaced apart bearings mounted in said frame in a central disposition relative to said frame, said frame having stator locating means arranged to hold an outer cylindrical surface of said stator concentric with said bearings; and a single shaft rotatably mounted directly in said bearings and carrying said rotor, and at least one bearing of said pair of bearings being spaced at a remote position relative to said stator; wherein said rotor comprises a backing ring of a magnetic material, a series of permanent magnets spaced apart on an inner surface of said backing ring, said backing ring and magnets being rotatable exteriorly of said stator windings, a hub mounted on said shaft, and a backing ring support holding inner faces of said permanent magnets concentric with said shaft.

2. An electric motor as claimed in claim 1, wherein said stator is disposed outboard of said frame and with said rotor has a connecting portion between a hub and a rim and said connecting portion being outboard of said stator.

3. An electric motor as claimed in claim 1 wherein said stator comprises an annular helix of a magnetic material, said helix having said poles extending outwardly from the circumferential surface of an annulus, said annular helix being mounted on said stator locating means.

4. An electric motor as claimed in claim 1, wherein insulation to insulate said windings from said poles is provided and comprises a pair of moldings, each said molding being in the form of an annulus with insulation covering one part of each pole, there being a division intermediate of the thickness of each pole between the two moldings.

5. An electric motor for a clothes washing machine, comprising: a stator formed as an annular helical yoke edgewise wound from a strip of magnetic material and having an inner face and an outer face, said strip having pole pieces formed integrally therewith, the pole pieces extending from one edge of said strip and said strip being edgewise wound whereby said pole pieces coincide in stacked groups to form a plurality of poles arranged at equally spaced intervals extending radially outwardly from the outer face of the yoke; energizable stator windings wound directly on said pole pieces of said stator and adapted to be energized through an electronic commutation circuit; a rotor mounted for rotation exteriorly of and relative to said stator, said rotor comprising a backing ring of magnetic material and a series of permanent magnets held at spaced-apart intervals on an inner surface of said backing ring and opposing the pole pieces of said stator; a motor frame having a single pair of spaced-apart bearings mounted in said frame in a central disposition relative to said frame, said frame having stator locating means arranged to hold an outer cylindrical surface of said stator concentric with said bearings; and a single shaft rotatably mounted directly in said bearings and carrying said rotor, and at least one bearing of said pair of bearings being spaced at a remote position relative to said stator.

6. An electric motor as claimed in claim 5, wherein the inner face edge of said stator strip opposite the edge thereof from which said pole pieces extend is notched between each adjacent pole so as to reduce the width of said stator strip whereby adjacent poles are connected by a narrow band of strip material.

7. An electric motor as claimed in claim 5, and further comprising insulated moldings on said poles, said stator windings being wound on said insulated moldings.

8. An electric motor as claimed in claim 6, and further comprising insulated moldings on said poles, said stator windings being wound on said insulated moldings.

* * * * *

UNITED STATES PATENT AND TRADEMARK OFFICE
CERTIFICATE OF CORRECTION

PATENT NO. : 5,266,855
DATED : November 30, 1993
INVENTOR(S) : Dennis E. Smith; John J.A. Williams; Gerald D. Duncan; Graeme D. Thomas and Frank W. Shacklock It is certified that error appears in the above-indentified patent and that said Letters Patent is hereby corrected as shown below:

Column 5, Line 28 "poles S" should be -- poles 8 --

Column 5, Line 55 "S4" should be -- 34 --

Column 7, Line 29 "electronic " -- Electronic --

Column 9 Line 26 please add the following advantages:

--4. The floating spin tub concept eliminates the need for springs and bearings and enables ready maintenance to be carried out.

5. The complete freedom of the agitator to rotate through an unlimited angle of rotation during agitation enables any desired angle of rotation. --

Signed and Sealed this

Nineteenth Day of July, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,266,855
DATED : November 30, 1993
INVENTOR(S) : Dennis E. Smith, et al It is certified that error appears in the above-indentified patent and that said Letters Patent is hereby corrected as shown below:

Column 9, line 26, please add the following advantages:

—4. The floating spin tub concept eliminates the need for springs and bearings and enables ready maintenance to be carried out.

5. The complete freedom of the agitator to rot.te through an unlimited angle of rotation during agitation enables any desired angle of rotation. —

Signed and Sealed this

Thirteenth Day of September, 1994

Attest:

BRUCE LEHMAN

Attesting Officer

Commissioner of Patents and Trademarks

US005266855C1

(12) EX PARTE REEXAMINATION CERTIFICATE (6794th)

United States Patent
Smith et al.

(10) Number: US 5,266,855 C1
(45) Certificate Issued: May 5, 2009

(54) ELECTRIC MOTOR FOR CLOTHES WASHING MACHINE DRIVE

(75) Inventors: Dennis E. Smith, Auckland (NZ); John J. A. Williams, Auckland (NZ); Gerald D. Duncan, Auckland (NZ); Graeme D. Thomas, Auckland (NZ); Frank W. Shacklock, Auckland (NZ)

(73) Assignee: Fisher & Paykel Limited, Auckland (NZ)

Reexamination Request:
No. 90/006,810, Oct. 16, 2003

Reexamination Certificate for:
Patent No.: 5,266,855
Issued: Nov. 30, 1993
Appl. No.: 07/566,844
Filed: Aug. 14, 1990

Certificate of Correction issued Jul. 19, 1994.

Certificate of Correction issued Sep. 13, 1994.

Related U.S. Application Data

(63) Continuation of application No. 07/361,593, filed on Jun. 2, 1989, now abandoned, which is a division of application No. 07/153,935, filed on Feb. 9, 1988, now Pat. No. 4,853,571, which is a division of application No. 07/022,894, filed on Mar. 6, 1987, now abandoned, which is a continuation of application No. 07/188,629, filed on May 2, 1988, now Pat. No. 4,813,243.

(30) Foreign Application Priority Data

| Mar. 6, 1986 | (NZ) | ................................. 215389 |
| Sep. 18, 1986 | (NZ) | ................................. 217623 |
| Nov. 21, 1986 | (NZ) | ................................. 218356 |

(51) Int. Cl.
*H02K 7/08* (2006.01)
*H02K 21/12* (2006.01)
*D06F 37/00* (2006.01)

(52) U.S. Cl. ..................... 310/90; 310/158.26; 310/267; 68/3 R

(58) Field of Classification Search ........................ None
See application file for complete search history.

(56) References Cited

U.S. PATENT DOCUMENTS 3,194,032 A 7/1965 Von Brimer (Continued)

FOREIGN PATENT DOCUMENTS

CH 462765 9/1968

(Continued)

OTHER PUBLICATIONS

Translation of jp 56–34391, Okada et al., Apr. 6, 1981.*
Objection filed in the European Patent Office by LG Electronics Deutschland GmbH, to EP 0 629 735 B1, the European counterpart to the patent–in–reexamination, Mar. 29, 2005.

(Continued)

*Primary Examiner*—Tuan H Nguyen

(57) ABSTRACT

An electric motor (2) for a clothes washing machine including the motor and a drive, the motor having a stator (25) held outboard of a frame carrying bearings (37, 38) in which a shaft (11) rotates, the shaft carrying the rotor (21) outboard of the stator (25), and permanent magnets (17) on an inner face of the rotor. The stator (25) is formed as an annular helical yoke edgewise wound from a strip of magnetic material and having an inner face and an outer face, the strip having pole pieces (8) formed integrally therewith extending from one edge of the strip and the strip being edgewise wound whereby the pole pieces coincide in stacked groups to form a plurality of poles arranged at equally spaced intervals extending radially outwardly from the outer face of the yoke. Energizable stator windings (26) are wound directly on the poles (8) of the stator and are adapted to be energized through an electronic commutation circuit (65, 66) and the rotor (21) is mounted for rotation exteriorly of and relative to the stator, the rotor comprising a backing ring (16) of magnetic material and a series of permanent magnets (17) held at spaced-apart intervals on an inner surface of the backing ring (16) and opposing the poles (8) of the stator (25).

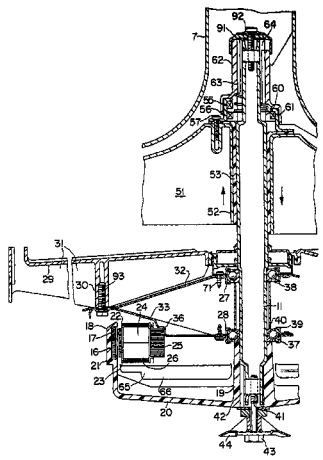

U.S. PATENT DOCUMENTS

| | | | | | |
|---|---|---|---|---|---|
| 3,329,845 | A | * | 7/1967 | Lear | 310/256 |
| 3,604,222 | A | | 9/1971 | Sandkrug et al. | 68/24 |
| 3,860,843 | A | | 1/1975 | Kawasaki et al. | |
| 3,914,963 | A | | 10/1975 | Brimer | 68/23.7 |
| 4,072,250 | A | | 2/1978 | Pedersen et al. | |
| 4,115,715 | A | | 9/1978 | Muller | 310/38 B |
| 4,197,489 | A | | 4/1980 | Dunn et al. | 318/138 |
| 4,217,508 | A | * | 8/1980 | Uzuka | 310/46 |
| 4,365,180 | A | * | 12/1982 | Licata et al. | 310/216 |
| 4,392,073 | A | | 7/1983 | Rosenberry, Jr. | |
| 4,437,325 | A | | 3/1984 | Hershberger | |
| 4,446,706 | A | | 5/1984 | Hartwig | 68/24 |
| 4,496,887 | A | | 1/1985 | Ichihara et al. | 318/254 |
| 4,513,230 | A | | 4/1985 | Erdman | 318/254 |
| 4,528,489 | A | | 7/1985 | Volk, Jr. | 318/480 |
| 4,570,093 | A | * | 2/1986 | Morii et al. | 310/46 |
| 4,585,963 | A | * | 4/1986 | Wilkinson et al. | 310/67 R |
| 4,647,803 | A | * | 3/1987 | von der Heide et al. | 310/51 |
| 4,712,035 | A | | 12/1987 | Forbes et al. | 310/269 |
| 4,818,911 | A | * | 4/1989 | Taguchi et al. | 310/259 |

FOREIGN PATENT DOCUMENTS

| | | |
|---|---|---|
| DE | 1907719 | 2/1969 |
| FR | 2.008.320 | 1/1970 |
| FR | 2.563.544 | 4/1984 |
| JP | 53-97269 | 2/1977 |
| JP | 56-34391 | 8/1979 |
| JP | 56166780 | 12/1981 |
| NZ | 91384 | 9/1945 |
| NZ | 108874 | 1/1953 |
| NZ | 148800 | 3/1969 |
| NZ | 156620 | 4/1970 |
| NZ | 179857 | 12/1977 |

OTHER PUBLICATIONS

Reply filed by the defendant in the District Court of Düsseldorf, *Fisher & Paykel* v. *LG Electronics Deutschland GmbH*, Mar. 29, 2005.

* cited by examiner

US 5,266,855 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5-8 is confirmed.

Claims 1-3 are determined to be patentable as amended.

Claim 4, dependent on an amended claim, is determined to be patentable.

New claims 9-24 are added and determined to be patentable.

1. An *electronically commutated* electric motor for a clothes washing machine comprising:
   a *single* stator carrying energizable windings *wound* on poles thereof;
   *an electronic commutation circuit configured to energize said windings of said single stator;*
   a *single* rotor;
   a motor frame having a single pair of spaced apart bearings mounted in said frame in a central disposition relative to said frame, said frame having stator locating means arranged to hold an outer cylindrical surface of said *single* stator concentric with said bearings;
   and a single shaft rotatably mounted directly in said bearings and carrying said *single* rotor, and at least one bearing of said pair of bearings being spaced at a remote position relative to said *single* stator;
   wherein said *single* rotor comprises a backing ring of a magnetic material, a series of permanent magnets spaced apart on an inner surface of said backing ring, said backing ring and magnets being rotatable exteriorly of said stator windings, [a hub mounted on said shaft,] and a backing ring support holding inner faces of said permanent magnets concentric with said shaft, *and said rotor comprising a hub mounted on said shaft, at least a portion of a structure connecting said shaft to said magnets being formed of a plastic material.*

2. An electric motor as claimed in claim 1, wherein said stator is disposed outboard of said frame and [with] said rotor has a connecting portion between a hub and a rim and said connecting portion being outboard of said stator.

3. An electric motor as claimed in claim 1 wherein said stator comprises an annular [helix of a] magnetic core [material, said helix] having said poles extending outwardly from the circumferential surface [of an annulus] *thereof and spaced apart from each other*, said annular [helix] *core* being mounted on said stator locating means.

9. *An electric motor for a clothes washing machine, comprising: a stator formed as an annular helical yoke edgewise wound from a strip of magnetic material and having an inner face and an outer face, said strip having pole pieces formed integrally therewith, the pole pieces extending from one edge of said strip and said strip being edgewise wound whereby said pole pieces coincide in stacked groups to form a plurality of poles arranged at equally spaced intervals extending radially outwardly from the outer face of the yoke, energizable stator windings wound directly on said pole pieces of said stator and adapted to be energized through an electronic commutation circuit; a rotor mounted for rotation exteriorly of and relative to said stator, said rotor comprising a backing ring of magnetic material and a series of permanent magnets held at spaced-apart intervals on an inner surface of said backing ring and opposing the pole pieces of said stator; a motor frame having a single pair of spaced-apart bearings mounted in said frame in a central disposition relative to said frame, said frame having stator locating means arranged to hold an outer cylindrical surface of said stator concentric with said bearings; and a single shaft rotatably mounted directly in said bearings and carrying said rotor, and at least one bearing of said pair of bearings being spaced at a remote position relative to said stator, wherein the inner face edge of said stator strip opposite the edge thereof from which said pole pieces extend is notched between each adjacent pole so as to reduce the width of said stator strip whereby adjacent poles are connected by a narrow band of strip material.*

10. *An electric motor as claimed in claim 9, further comprising insulated moldings on said poles, said stator winding being wound on said insulated moldings.*

11. *An electric motor as claimed in claim 9, wherein the inner face edge of said stator strip opposite the edge thereof from which said pole pieces extend is notched between each adjacent pole so as to reduce the width of said stator strip whereby adjacent poles are connected by a narrow band of strip material.*

12. *An electric motor as claimed in claim 9, and further comprising insulated moldings on said poles, said stator windings being wound on said insulated moldings.*

13. *An electric motor as claimed in claim 12, and further comprising insulated moldings on said poles, said stator windings being wound on said insulated moldings.*

14. *An electric motor as claimed in claim 9, wherein said stator comprises a single stator.*

15. *An electric motor as claimed in claim 9, wherein said rotor comprises a single rotor.*

16. *An electric motor as claimed in claim 9, wherein said windings are arranged in a single circumferential arrangement.*

17. *An electric motor as claimed in claim 9, wherein the magnets are arranged in a single circumferential arrangement.*

18. *An electric motor as claimed in claim 9, wherein the windings are arranged in a single circumferential arrangement and the magnets are arranged in a single circumferential arrangement.*

19. *An electric motor as claimed in claim 9, wherein said at least one bearing spaced at a remote position relative to said stator is an inboard bearing of said single pair of spaced apart bearings.*

20. *An electric motor as claimed in claim 9, further comprising an electronic commutation circuit configured to energize said windings of said stator such that said rotor moves in a wash motion, as well as a spin motion.*

21. *An electronically commutated electric motor for a clothes washing machine comprising:*
   *a single stator carrying energizable windings wound on poles thereof,*
   *an electronic commutation circuit configured to energize said windings of said single stator;* a single rotor;

a motor frame having a single pair of spaced apart bearings mounted in said frame in a central disposition relative to said frame, said frame having stator locating means arranged to hold an outer cylindrical surface of said single stator concentric with said bearings;

said single stator comprising axially opposite first and second ends such that said first end and said second end define generally parallel planes, said first end is closer to said motor frame than said second end;

and a single shaft rotatably mounted directly in said bearings and carrying said single rotor, and at least one bearing of said pair of bearings being spaced at a remote position relative to said single stator and said first end of said stator being disposed generally between said pair of bearings;

wherein said single rotor comprises a backing ring of a magnetic material, a series of permanent magnets spaced apart on an inner surface of said backing ring, said backing ring and magnets being rotatable exteriorly of said stator windings, a hub mounted on said shaft, and a backing ring support holding inner faces of said permanent magnets concentric with said shaft.

22. An electronically commutated electric motor for a clothes washing machine comprising:

a single stator carrying energizable windings wound on poles thereof;

an electronic commutation circuit configured to energize said windings of said single stator;

a single rot or;

a motor frame having a single pair of spaced apart bearings mounted in said frame in a central disposition relative to said frame, said frame having stator locating means arranged to hold an outer cylindrical surface of said single stator concentric with said bearings;

said single stator comprising axially opposite first and second ends such that said first end and said second end define generally parallel planes;

and a single shaft rotatably mounted directly in said bearings and carrying said single rotor, at least one bearing of said pair of bearings being spaced at a remote position relative to said single stator, and at least one of said bearings being positioned between said first end and said second end of said stator;

wherein said single rotor comprises a backing ring of a magnetic material, a series of permanent magnets spaced apart on an inner surface of said backing ring, said backing ring and magnets being rotatable exteriorly of said stator windings, a hub mounted on said shaft, and a backing ring support holding inner faces of said permanent magnets concentric with said shaft.

23. An electronically commutated electric motor for a clothes washing machine comprising:

a single stator carrying energizable windings wound on poles thereof;

an electronic commutation circuit configured to energize said windings of said single stator;

a single rotor;

a motor frame having a single pair of spaced apart bearings mounted in said frame in a central disposition relative to said frame, said frame having stator locating means arranged to hold an outer cylindrical surface of said single stator concentric with said bearings;

and a single shaft rotatably mounted directly in said bearings and carrying said single rotor, and at least one bearing of said pair of bearings being spaced at a remote position relative to said single stator;

wherein said single rotor comprises a backing ring of a magnetic material, a series of permanent magnets spaced apart on an inner surface of said backing ring, said backing ring and magnets being rotatable exteriorly of said stator windings, and a backing ring support holding inner faces of said permanent magnets concentric with said shaft and said rotor comprising a hub mounted on said shaft that is positioned adjacent to at least one of said pair of bearings.

24. An electronically commutated electric motor for a clothes washing machine comprising:

a single stator carrying energizable windings wound on poles thereof;

an electronic commutation circuit configured to energize said windings of said single stator;

a single rotor;

a motor frame having a single pair of spaced apart bearings mounted in said frame in a central disposition relative to said frame, said frame having stator locating means arranged to hold an outer cylindrical surface of said single stator concentric with said bearings;

and a single shaft rotatably mounted directly in said bearings and carrying said single rotor, and at least one bearing of said pair of bearings being spaced at a remote position relative to said single stator;

wherein said single rotor comprises a backing ring of a magnetic material, a series of permanent magnets spaced apart on an inner surface of said backing ring, said backing ring and magnets being rotatable exteriorly of said stator windings, a hub mounted on said shaft, and a backing ring support holding inner faces of said permanent magnets concentric with said shaft, said shaft and said hub being connected for rotation using an axially-interlocking structure that generally prevents relative rotational movement between said shaft and said hub.

* * * * *